Oct. 26, 1965   K. L. KIRKPATRICK ETAL   3,214,002
HARVESTER WITH SHIFTABLE AND REVERSIBLE CONVEYOR MEANS
Filed Jan. 23, 1964   3 Sheets-Sheet 1
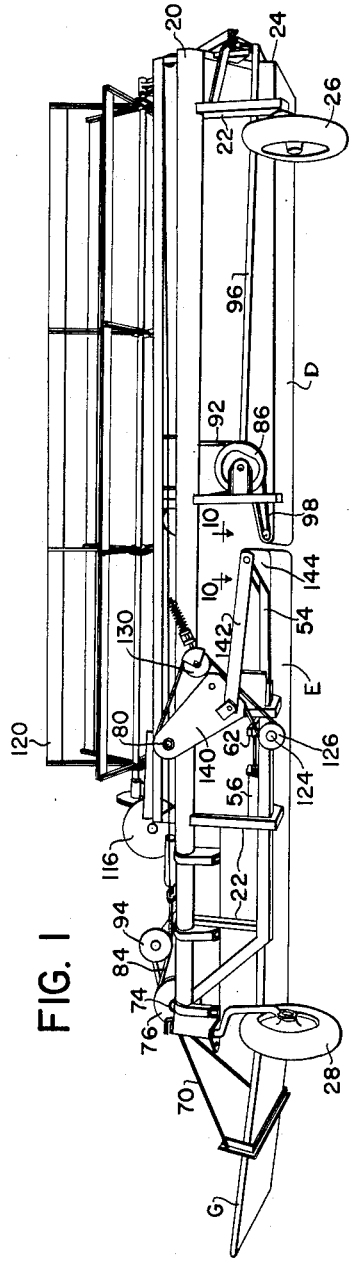
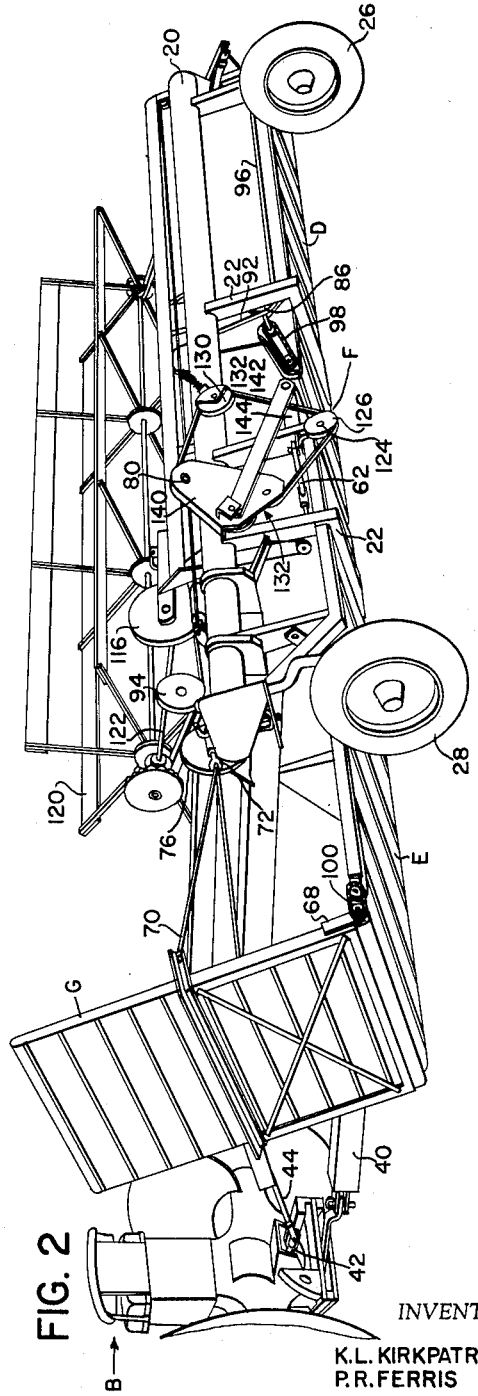
INVENTORS
K.L. KIRKPATRICK &
P.R. FERRIS

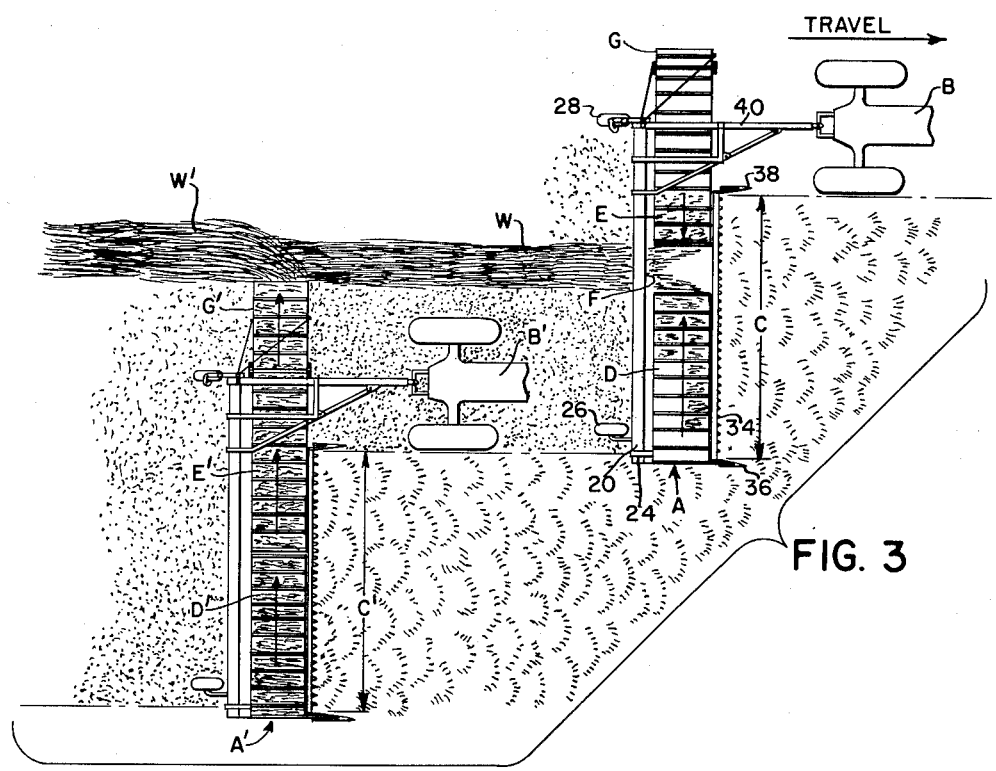
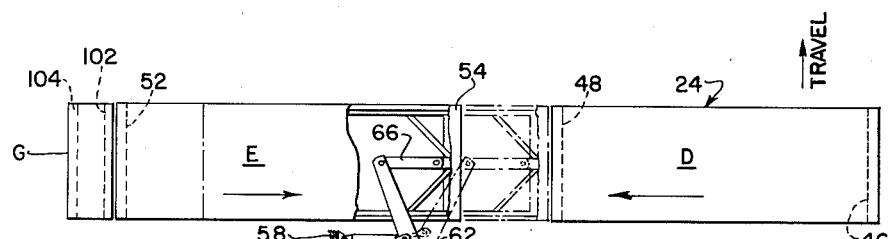
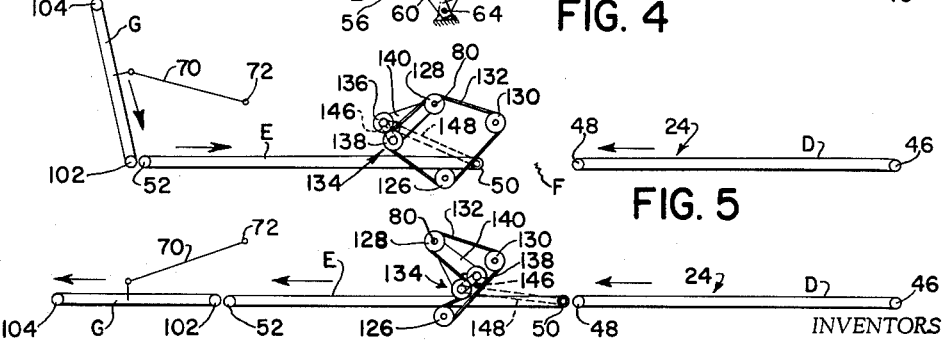

Oct. 26, 1965  K. L. KIRKPATRICK ETAL  3,214,002
HARVESTER WITH SHIFTABLE AND REVERSIBLE CONVEYOR MEANS
Filed Jan. 23, 1964                                              3 Sheets-Sheet 3

INVENTORS
K. L. KIRKPATRICK &
P. R. FERRIS

United States Patent Office 3,214,002
Patented Oct. 26, 1965

3,214,002
HARVESTER WITH SHIFTABLE AND REVERSIBLE CONVEYOR MEANS
Kenneth L. Kirkpatrick, Welland, Ontario, and Paul R. Ferris, Niagara Falls, Ontario, Canada, assignors to Deere & Company, Moline, Ill., a corporation of Delaware
Filed Jan. 23, 1964, Ser. No. 339,665
12 Claims. (Cl. 198—36)

This invention relates to a harvester and more particularly to a harvester of the windrower type, which is adapted to cut standing grain and the like and to form same into windrows for subsequent pickup by a combine, for example.

Windrowers are known in the art to operate on standing crops and to form same into windrows at either end of the machine or in areas intermediate the opposite ends or sides of the platform or header. In the case of the former machine, a single conveyor will be disposed rearwardly of the cutting mechanism to receive crops therefrom and to convey these crops to one end of the platform, normally the left-hand end. In the center-delivery type, a pair of transversely alined conveyors deliver in common, by running in opposite inward directions, to a central discharge opening. In not every case will the opening be exactly in the center of the platform but the expression "center delivery" is conventionally used to distinguish from an end-delivery windrower.

In the use of machines of either of the above categories, it very often happens that the standing grain is relatively thin and consequently the windrow formed by the machine will also be thin or light. Consequently, if such windrow is picked up by a large-capacity combine, a good deal of the efficiency of the process is lost, because the combine has capacity far in excess of that required to handle the light windrow. To overcome this, it has been conceived that if the windrows could be doubled—that is, two windrows laid side-by-side or one on top of the other—the quantity of crops in the windrow could be easily handled by the combine. The problem, however, is not so easily solved, because normally a windrow can be formed only from crops cut in the swath being operated on and therefore, as the machine travels about the field, the relatively thin windrows will still be spaced apart by distances equal to the width of the swath, and it therefore requires the operation of an additional machine, such as a side delivery rake or the like, to accumulate windrows in at least doubled quantities.

According to the present invention, this problem is solved in a single machine having conveyor means that may be relatively shifted and reversed as to direction of travel so that on the first turn about the field, the windrower will operate as a center-delivery type and on the second turn about the field will operate as end-delivery type, provision being made so that the end-delivered windrow is laid closely adjacent to or on top of the previously formed center-delivered windrow. It is a feature of the invention to provide such machine with automatically reversible driving means so that the two conveyors drive toward each other in the center-delivery aspect and drive in the same direction to perform essentially as a single conveyor in the end-delivery aspect.

Further objects reside in improved means for shifting the conveyors relatively, for reversing the drive to one of the conveyors, the addition of a third or extension conveyor for use in the end-delivery aspect of the machine, improved controls for effecting shifting and reversing of the conveyor means, and other objects and features as will become apparent to those versed in the art, on the basis of the ensuing description of a preferred embodiment of the invention, taken in conjunction with the accompanying sheets of drawings, the figures of which are described below.

FIG. 1 is a rear perspective view of a windrower operating in its end-delivery aspect.

FIG. 2 is also a rear perspective, from a somewhat different angle and drawn to a larger scale, showing the windrower in its center-delivery aspect.

FIG. 3 is an over-all, somewhat schematic illustration of two sequential phases in the cutting and windrowing operation, the figures being considerably reduced in scale as respects FIGS. 1 and 2.

FIG. 4 is a schematic plan view, showing in full lines the relationship of the conveyors when operating as a center-delivery machine and showing, in broken lines, the shifted position of the left-hand conveyor when the machine is converted for end-delivery operation.

FIG. 5 is a schematic rear view of the full-line portion of FIG. 4.

FIG. 6 is a rear view, somewhat schematic as in FIG. 5, of the end-delivery aspect of FIG. 4.

Figure 7:
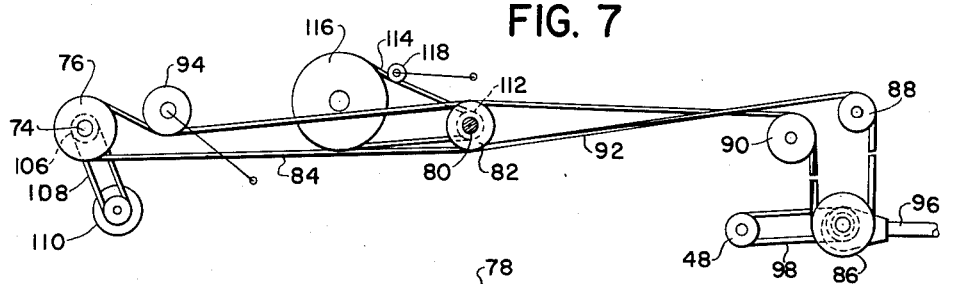
FIG. 7 is a schematic illustration of the drive for the basic parts of the machine.

Reference will be had first to FIG. 3 which may be regarded as two identical machines, with differences to be noted later, operating one behind the other, but in offset relationship over the same field. The first machine is, for convenience, identified as windrower A, drawn by a typical tractor B and cutting a swath C. The crops cut from the swath C are directed rearwardly over the cutting mechanism to be received in part by right- and left-hand conveyors D and E, respectively, which travel inwardly toward each other as indicated by the arrows for discharging the crops to a "center" delivery opening or discharge area F, it being understood that the crops moving rearwardly over that portion of the cutting mechanism between the spaced apart discharge or terminal inner ends of the conveyors will fall directly through the discharge opening F. All the crops thus are formed into a windrow W. Since the grain has been cut in the swath C, the windrow W will be deposited on the stubble. To the extent described, the operation is not unlike the conventional practice followed with so-called center-delivery windrowers.

The assumed second machine A' is drawn by a tractor B' to cut a swath C' immediately adjacent to the previously cut swath C. However, in this case the machine A' has its conveyors D and E adjusted and reversely driven so that not only is the center-delivery opening closed, but both conveyors operate in the same direction, here to the left, as indicated by the arrows. Thus, crops directed rearwardly over the cutting mechanism fall on the two conveyors D' and E' and are conveyed leftwardly and are transferred thence to a third conveyor G' so that these crops fall directly on or closely alongside the previous windrow W, this forming a double windrow W'. In the case of machine A, the third conveyor G is in an inactive or folded position, the details of which will be discussed subsequently.

If each of the swaths C and C' be regarded as 16-foot cuts, then the two together will equal a 32-foot swath of which all the crops are formed into the windrow W'. For reasons pointed out above, the double windrow is easily picked up by a large-capacity combine and overall operating efficiency is improved.

If FIG. 3 be regarded as representing the first two turns about the field, either by machine A operating first as shown in the upper right-hand portion of the figure and then by machine A converted to machine A', the third round will be a repeat of the performance of machine A, the fourth will be a repeat of the performance of machine A' and so on. As already indicated, the figure may also be regarded as representing a "tandem" operation of two machines A and A', the latter being of course identical to machine A but converted from a center-delivery type to the end-delivery type.

In the ensuing description, the recognized distinction will be ignored and the structure will be described on the basis of a convertible machine.

As best seen in FIG. 1, the basic machine comprises an elongated upper main frame member 20 having rigid depending structural members 22 forming part of a platform 24 on which the two conveyors D and E are carried. The machine is carried at its opposite ends or sides by right- and left-hand wheels 26 and 28, respectively.

Here, as elsewhere herein, the expressions "right," "left," "front" etc., are used as terms of convenience and not of limitation, it being recognized that the structure is based on conventional windrowing practices where the direction of travel is to the right of the sheet in FIG. 3, and the locations right and left are those relative to the position of an observer standing behind the machine and facing forwardly.

Figure 9:
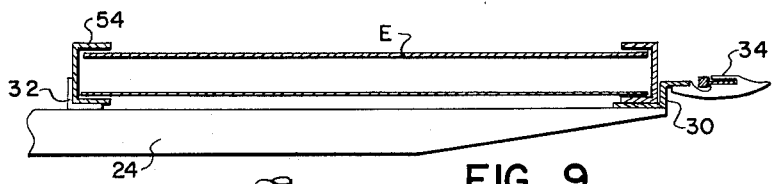
FIG. 9 is an end view, partly in section and drawn to an enlarged scale as seen along the line 9—9 of FIG. 8.

As best seen in FIG. 9, the platform 24 is made up of front and rear elongated frame members 30 and 32, rigidly joined to the forward extending rigid arms of the structure 22, and the member 30 serving to carry a plurality of guards, as well as a reciprocating knife, collectively referred to here as the cutting mechanism 34. As seen in FIG. 3, the cutting mechanism 34 is delineated at opposite ends by right- and left-hand dividers 36 and 38, respectively, as is conventional for the purpose of defining the swath C. The cutting mechanism 34 extends completely across the front or leading edge of the platform and therefore spans the discharge opening F when the conveyors D and E occupy the position as illustrated in machine A.

The frame structure for the platform further includes forwardly extending draft structure 40 for connection to the drawbar of the tractor B. The tractor, which may be a typical agricultural tractor, has a rear power take-off shaft 42 from which the drive is taken to the machine in the first instance via a propeller shaft 44 (FIG. 2).

On the basis of reference above to the machine as having right- and left-hand opposite sides, these may be represented by the right- and left-hand dividers 36 and 38, respectively. As seen in FIG. 3, the transverse member 20 is at the rear of the machine and, as already noted briefly, the conveyors D and E are carried intermediate the front and rear portions of the machine as represented by the frame structure or guides 30 and 32.

The conveyors shown here are each of the endless type, commonly known as a canvas. The conveyor D is carried on opposite end rollers 46 and 48 and the canvas is of course trained about these rollers and the direction of drive is such that the upper surface of the canvas travels inwardly as shown by the arrow. The shafts (not shown) for the rollers 46 and 48 may be journaled in the platform 24 in any suitable manner, not material here.

Figure 8:
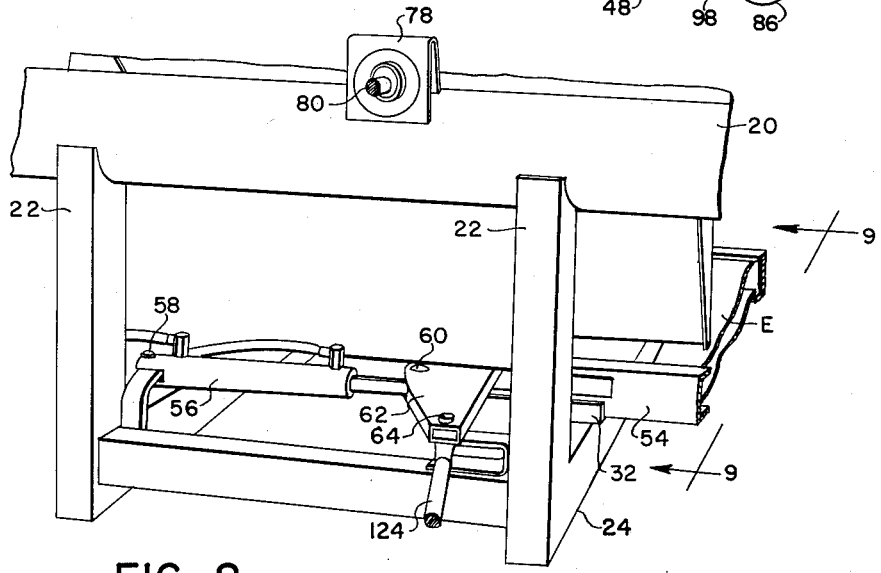
FIG. 8 is an enlarged perspective, with portions broken away and other portions shown in section, illustrating a central portion of the machine and primarily the means for shifting the left-hand conveyor.

The second conveyor E is likewise, or may be, of the canvas type, being carried at opposite ends by inner and outer rollers 50 and 52, respectively, and the entire conveyor is carried in a subframe 54 which is shiftable lengthwise of the platform by means of being carried by the front and rear platform guide members 30 and 32 (FIGS. 8 and 9).

When operating as machine A, the conveyors D and E function so that their respective upper surfaces travel toward each other or toward the crop-discharge area or opening F, from which it follows that the conveyor E is in its leftward or first position (full lines, FIG. 4; FIG. 5). FIG. 6 and machine A' show that the conveyor E has been shifted to the right so that the end carried by the roller 50 is in substantially abutting relationship or crop-transfer relationship to the end of conveyor D represented by the roller 48. In other words, the crop opening F is now closed. At the same time, the direction of travel of conveyor E is reversed so that both conveyors travel in the same direction, with the result that the crops, instead of being discharged through the opening F, which is now nonexistent, are carried to the left side of the machine for ultimate transfer to the conveyor G, which has been moved from its inactive position of FIG. 5 to its active position of FIG. 6. Consequently, the crops will be delivered from the left-hand end of the triple conveyor system for forming the windrow W'.

The means for effecting shifting of conveyor E between its first position (FIG. 5) and its second position (FIG. 6) includes a power-operated device, here a hydraulic motor or ram 56, anchored at 58 to the platform and having its piston connected at 60 to a lever 62 which is also fulcrumed or pivoted to the frame at 64. When the motor 56, which may be operated by the hydraulic system typical of any agricultural tractor, is retracted (FIGS. 4 and 5) the conveyor E is in its outer or leftward position. When fluid under pressure is supplied to the ram or motor, the arm 62 swings to the right about its pivot or fulcrum 64 and, through the intermediary of a link 66 connected between the lever and the subframe 54, shifts the entire subframe, together with its conveyor E, to the right or in crop-transfer relationship to the other conveyor D (FIG. 6).

The conveyor G is linked at 68 to the outer or left-hand end of the conveyor E so that the conveyor G is moved between its active and inactive positions as the conveyor E moves between its inner and outer positions. The conveyor G is supported intermediate its ends by a link 70 which has a pivotal connection 72 to the left-hand end of the upper frame member 20. Thus, as will be seen from a comparison of FIGS. 5 and 6, as the conveyor E moves inwardly, it draws the inner end of the conveyor G with it, and the link 70 swinging about the pivot 72, causes the conveyor G to assume a generally horizontal position in FIG. 6 as compared to its upright or folded position of FIG. 5. The active position of conveyor G is shown in FIG. 1; its inactive position is shown in FIG. 2.

As previously described, the drivable parts of the windrower are driven from the tractor power take-off shaft 42 through the propeller shaft 44. The latter shaft is appropriately connected to a power shaft 74 (FIGS. 1 and 7) on which is keyed a sheave 76. Appropriately mounted on a portion of the frame 20 just to the left of the crop delivery opening F is a fixed bracket 78 which journals a shaft 80, and fastened on this shaft is a double sheave 82, one portion of which is belted to the sheave 76 by a belt 84 and another portion of which is belted to a pitman drive sheave 86 in conjunction with a pair of idlers 88 and 90, this second belt being denoted by the numeral 92 and being trained as shown in FIG. 7 to complete the drive from the double sheave 82 to the pitman sheave 84. A biased idler 94 operates on the belt 84 between the sheaves 76 and 82. The pitman sheave is ultimately connected to a pitman 96 which in turn is connected to and reciprocates the cutting mechanism 34, the details of which are not material here. A chain drive 98 connects the shaft of the pitman sheave 86 to the inner roller 48 of the canvas or conveyor D (FIGS. 1, 2 and 7).

In FIG. 7, the direction of rotation of the power sheave 76 is clockwise, which of course is also true of the double sheave 82. However, since the belt 92 is crossed, the rotation of the pitman drive sheave 86 is counterclockwise, which is also true of the chain 98 for the roller 48 of the right-hand conveyor D. Consequently, the direction of travel of the conveyor D is such that its inner surface moves inwardly, as already noted. This direction is maintained throughout operation of the machine, irrespective of the position of the other conveyor E.

A drive chain 100 (FIG. 2) connects the left-hand or outer roller 52 of the conveyor E to the adjacent inner roller 102 of the conveyor G so that the conveyors E and G always travel in the same direction; although, as will be brought out below, this direction is selectively reversible. The outer end of the conveyor G is carried by a roller 104.

The power shaft 74 further carries a sprocket 106 which, by means of a chain 108, drives a hydraulic pump 110, which may be used for pressurizing other devices on the windrower, not important here.

The shaft 80, to which the double sheave 82 is affixed, further carries a sheave 112 which is belted at 114 to a reel input sheave 116, and a biased idler 118 acts on the belt 114. By means of appropriate bevel gearing, the reel sheave 116 drives a typical reel, shown here at 120, associated in conventional fashion with the platform 24 and cutting mechanism 34. Part of the drive from the sheave 116 to the reel 120 is visible at 122 in FIG. 2. These details are not material and are briefly described only because they are illustrated.

The drive for the conveyor E is best shown in FIGS. 5 and 6. First, however, a preliminary reference will be had to FIG. 8 to point out a fixed shaft 124 on which is journaled a lower idler 126, the position of which never changes, which is true also of an upper drive sheave 128 keyed to and rotatable with the shaft 80 along with the double sheave 82. Also included in the drive means is a biased idler 130, the position of which may be regarded as fixed, except for the slight movement incident to the spring load therein. A drive belt 132 is trained about the sheaves 126, 128 and 130 and additionally about reversing sheave means designated as a whole by the numeral 134. The reversing sheave means comprises two sheaves 136 and 138 carried by a swinging arm or support 140, the pivot of which is coincident with the shaft 80 which carries the upper or drive sheave 128.

Figure 10:
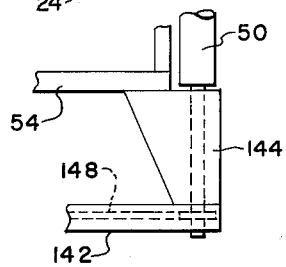
FIG. 10 is a fragmentary plan view, with portions omitted, as seen generally along the line 10—10 of FIG. 1.

The arm 140 is capable of swinging between two positions, the inner or right-hand of which is illustrated by FIGS. 1 and 6 and the outer or left-hand of which is illustrated by FIGS. 2 and 5. The arm 140 is connected to the subframe 54 for the conveyor E by means of a link 142 which in turn is connected by means of a rearwardly extending bracket or support 144 to the rearward inner portion of the subframe 54 (FIG. 10). Therefore, each time the ram or cylinder 56 is extended and retracted, to shift the position of the conveyor E, the sheave-carrying arm 140 is similarly swung about its pivot on the shaft 80. The two sheaves 136 and 138 are drivingly interconnected by a chain 146; and the sheave 136 is connected by a chain 148 to the inner roller 50 of the conveyor E, the chain 148 lying ahead of the link 142.

As best seen in FIG. 5, with the arm 140 in its leftward position, which is consistent with the leftward or outer position of the conveyor E, the belt 132 is in driving engagement with the sheave 138 but not with the sheave 136. Therefore, and regarding the direction of rotation of the drive sheave 128 as clockwise, it will be seen that the sheave 138 is also driven clockwise. The chain 146 of course causes the sheave 136 to be driven clockwise and the same direction is imparted to the conveyor E because of the chain 148. The conveyor E therefore travels so that its upper surface moves inwardly or in the direction of the arrow; a direction that is opposite to that of the inwardly traveling conveyor D, whereby the machine, operating as a center-delivery windrower, discharges through the discharge opening F to form the windrow W.

When the conveyor E is shifted to its inward position (FIG. 6), the arm 140 also swings inwardly because of its connection to the power-operated means 56. As the arm swings, it transfers the drive belt 132 from the sheave 138 to the sheave 136; that is, the sheave 138 is no longer driven by the belt 132. Therefore, the clockwise rotation of the driving or input sheave 128 is converted to counterclockwise driving of the sheave 136 and this sheave directly drives the roller 50 for the conveyor E, thereby driving the conveyor in the opposite direction; a direction in which its upper surface travels outwardly or in the same direction as the upper surface of the conveyor D. Because of the inward shift of the conveyor E, the discharge opening F disappears and the terminal ends of the two conveyors D and E are in crop-transfer relationship so that all the crops move laterally outwardly or to the left. As previously described, the conveyor G is driven by the chain 100 from the outer end of the conveyor E and therefore the direction of travel of the upper surface of the conveyor G is the same as that of the upper surface of the conveyor E. In effect, the conveyor G is an end-to-end extension of the conveyor E. Actually, this is true of all three conveyors D, E and G so that the upper surfaces travel with one as an extension of the other so that the crop is discharged to form the double windrow W' (FIG. 3).

It will be seen that the invention features the automatic change in direction of travel of the conveyor E in response to the change in its position relative to the conveyor D. A further automatic feature is the association of the conveyor G; that is to say, when the conveyor E is in its outward position for center-delivery operation the conveyor G is in a folded inactive position. Even though it runs, because of the chain connection at 100, it performs no function. On the other hand, when the conveyor E is shifted to its inward position (FIG. 6) the conveyor G automatically assumes its active position and, since it is continuously driven by the conveyor E, it operates as an extension of conveyor E to discharge at the left-hand of the machine.

A further characteristic of the machine is that the conveyors are in transverse alinement, which means that the fore-and-aft dimension of the machine need not be enlarged. When the machine is operated as a center-delivery machine or even when transported in its operative position, the conveyor G, being folded upwardly, does not add materially to the overall width of the machine. Fundamentally, however, the basic concept is the convertibility of the machine from a center-delivery type to an end-delivery type, and this, as pointed out above, is easily accomplished by shifting the conveyor E between inner and outer positions, which entails automatic reversing of its direction of travel along with automatic positioning of conveyor G.

Features in addition to those categorically enumerated herein will readily occur to those versed in the art, as will many modifications and alterations in the preferred structure illustrated, all of which may be achieved without departure from the spirit and scope of the invention.

What is claimed is:

1. A crop harvester, comprising: a platform having first and second opposite sides and a transverse leading edge extending between said sides and over which crops are directed rearwardly; a first transverse crop-receiving conveyor carried by the platform behind a portion of the leading edge and extending from one side of the platform to a discharge area intermediate said platform sides; a second transverse crop-receiving conveyor disposed behind another portion of said leading edge in an outer position extending between said second side of the platform to said discharge area and terminating short of the first conveyor; means mounting the second conveyor on the platform for selective transverse shifting between said outer position and an inner position in end-to-end crop-transfer relation to the first conveyor; first drive means for driving one conveyor at all times in an inward direction; and reversible second drive means for selectively driving the other conveyor in either inward or outward directions.

2. The invention defined in claim 1, including: power-operated means connected between the platform and the second conveyor for selectively shifting the latter between its two positions.

3. The invention defined in claim 2, in which: said power-operated means includes a lever fulcrumed on the platform and connected to the second conveyor and a fluid-pressure motor operatively connected between the lever and the platform.

4. The invention defined in claim 3, in which: the lever extends rearwardly of the second conveyor and the motor is located rearwardly of said second conveyor.

5. The invention defined in claim 1, in which: the second drive means is operative automatically to drive the reversibly drivable conveyor inwardly or outwardly respectively according to the outer and inner positions of the second conveyor.

6. The invention defined in claim 5, in which: said second drive means includes a driving sheave, an idler sheave, an endless belt trained about said sheaves, and reversing sheave means drivingly connected to the reversibly drivable conveyor, and means interconnecting said reversing sheave means to the second conveyor for alternate engagement with the belt according to the positions of the second conveyor.

7. The invention defined in claim 6, in which: the reversing sheave means includes separate forward and reverse sheaves alternately engageable with the belt as the second conveyor changes position.

8. The invention defined in claim 1, including: a third conveyor at the second side of the platform; means mounting said third conveyor for movement between an inactive position closely alongside said second side of the platform and an active position operative as an end-to-end extension of the second conveyor; and means for driving said third conveyor in at least its active position.

9. The invention defined in claim 8, including: means interconnecting the second and third conveyors for moving said third conveyor between its inactive and active positions respectively according to the outer and inner positions of said second conveyor.

10. The invention defined in claim 8, in which: said drive means for the third conveyor is connected to and driven by the reversibly drivable conveyor.

11. The invention defined in claim 8, in which: said third conveyor is hinged to the platform at the second side thereof on a fore-and-aft axis for vertical swinging between its active and inactive positions.

12. The invention defined in claim 1 in which: the first conveyor is driven at all times in an inward direction; the second conveyor is reversibly driven; the reversible drive means is actuated by shifting of the second conveyor so that when the second conveyor is in its outer position crops are delivered inwardly by the respective conveyors and when the second conveyor is in its inner position crops travel along both conveyors to the second side of the platform; and extension conveyor means is provided at the second side of the platform as an outward prolongation of the second conveyor, when the latter is in its inner position, to compensate for shifting of said second conveyor to said inner position.

References Cited by the Examiner
UNITED STATES PATENTS

| 420,329 | 1/90 | Bovee | 56—181 |
| 1,792,691 | 2/31 | Harris | 56—181 |

SAMUEL F. COLEMAN, *Primary Examiner.*